United States Patent
Raghunath et al.

[11] Patent Number: 5,937,438
[45] Date of Patent: Aug. 10, 1999

[54] SINE/COSINE LOOKUP TABLE

[75] Inventors: Kalavai Janardhan Raghunath, Chatham, N.J.; Marta M. Rambaud, Allentown, Pa.

[73] Assignee: Lucent Technologies Inc., Murray Hill, N.J.

[21] Appl. No.: 08/885,150

[22] Filed: Jun. 30, 1997

[51] Int. Cl.$^6$ .............................. G06F 1/035; G06F 12/02
[52] U.S. Cl. ............................................ 711/211; 364/721
[58] Field of Search ............................. 711/211; 364/721

[56] References Cited

U.S. PATENT DOCUMENTS 3,898,446  8/1975  Vatz ........................................ 364/730
4,827,442  5/1989  Mehrgardt et al. ..................... 364/721

Primary Examiner—Jack A. Lane
Attorney, Agent, or Firm—John P. Veschi

[57] ABSTRACT

A lookup table includes a complementer, a memory and a switching element. The complementer selectively complements a subset of bits of a multibit designation of an angle based on a most significant bit of the multibit designation to produce an address signal. The memory is addressed by the address signal and produces two values. The switching element receives the two values from the memory and selectively outputs the values based on the most significant bit.

20 Claims, 2 Drawing Sheets

SINE/COSINE LOOKUP TABLE

BACKGROUND OF THE INVENTION

Many applications involving the processing of digital signals require the frequent determination of sine and cosine values for given angles. These values can be determined either through calculation or by looking the values up in a lookup table in which sine and cosine values have previously been stored. Alternatively, some conventional systems determine sine and cosine values by looking up a first value and then calculating the desired value through series expansion. Each of the conventional methods of determining sine and cosine values have drawbacks in that they require multiple steps or clock cycles to complete, or in that they require too many memory locations. A need, therefore, exists for a sine/cosine lookup table that is compact and can be read in one clock cycle.

FIG. 2 shows an example of a conventional sine/cosine lookup table. Here, table 105 includes a plurality of memory locations, such as, locations 107 and 109. The left column 111, including memory location 107, contains a plurality of sine values. The right column 113, including location 109, contains a plurality of cosine values. Memory locations 107 and 109 comprise a row of lookup table 105. Conventionally, the rows of lookup table 105 cover a range from 0 degrees to 180 degrees. During a lookup operation, the address of the row corresponding to the desired angle is determined, and the corresponding sine value is read from column 111, and the corresponding cosine value is read from column 113. A disadvantage of the conventional table shown in FIG. 2 is that the lookup table requires the use of a significant number of memory locations.

A system can employ an alternative to the conventional lookup table shown in FIG. 2 and use roughly half as many memory locations. Such a system has a lookup table containing sine values from 0 to 180 degrees, such as that shown in column 111. The savings in the number of memory locations can be realized by eliminating a corresponding array of cosine values, such as that contained in column 113. When a cosine value is desired for a given angle, the system first determines the value of a complementary angle, the sine of which equals the cosine of the given angle. Then, to look up the cosine value for the given angle, the system simply looks up the sine of the complementary angle. For example, if the sine and cosine of 30 degrees are desired, the system will first read the sine value from the memory location corresponding to the 30 degrees, and the system will then determine that the value for the cosine of 30 degrees should be read from the memory location corresponding to the sine of 60 degrees. Thus, in comparison to the conventional lookup table of FIG. 2, the system employing the alternative conventional lookup table saves on the number of memory locations at the expense of additional logic and computations.

SUMMARY OF THE INVENTION

It is an aspect of the invention to provide a sine/cosine lookup table that is compact and can provide the sine and cosine values for a given angle in as little as one clock cycle. In one embodiment according to the invention, a lookup table includes a complementer, a memory array and a switching element. The complementer selectively complements a subset of bits of a multibit designation of an angle based on a most significant bit of the multibit designation to produce an address signal. The memory is addressed by the address signal and produces two values. The switching element receives the two values from the memory and selectively outputs the values based on the most significant bit. The lookup table can be incorporated into an integrated circuit device, such as an integrated circuit based modem.

In another embodiment according to the invention, a method of obtaining sine and cosine values corresponding to an angle, includes the steps of breaking a multibit designation corresponding to the angle into a most significant portion and a non-most significant portion, selectively complementing the non-most significant portion based on the most significant portion to produce an address signal, inputting the address signal to a memory, reading first and second values addressed by the address signal from the memory, and selectively outputting the first value and the second value as the sine and cosine of the angle based on the most significant portion.

BRIEF DESCRIPTION OF THE DRAWINGS

The foregoing features will be more fully understood from the following detailed description taken in view of the drawings, wherein.

DETAILED DESCRIPTION

Figure 1:
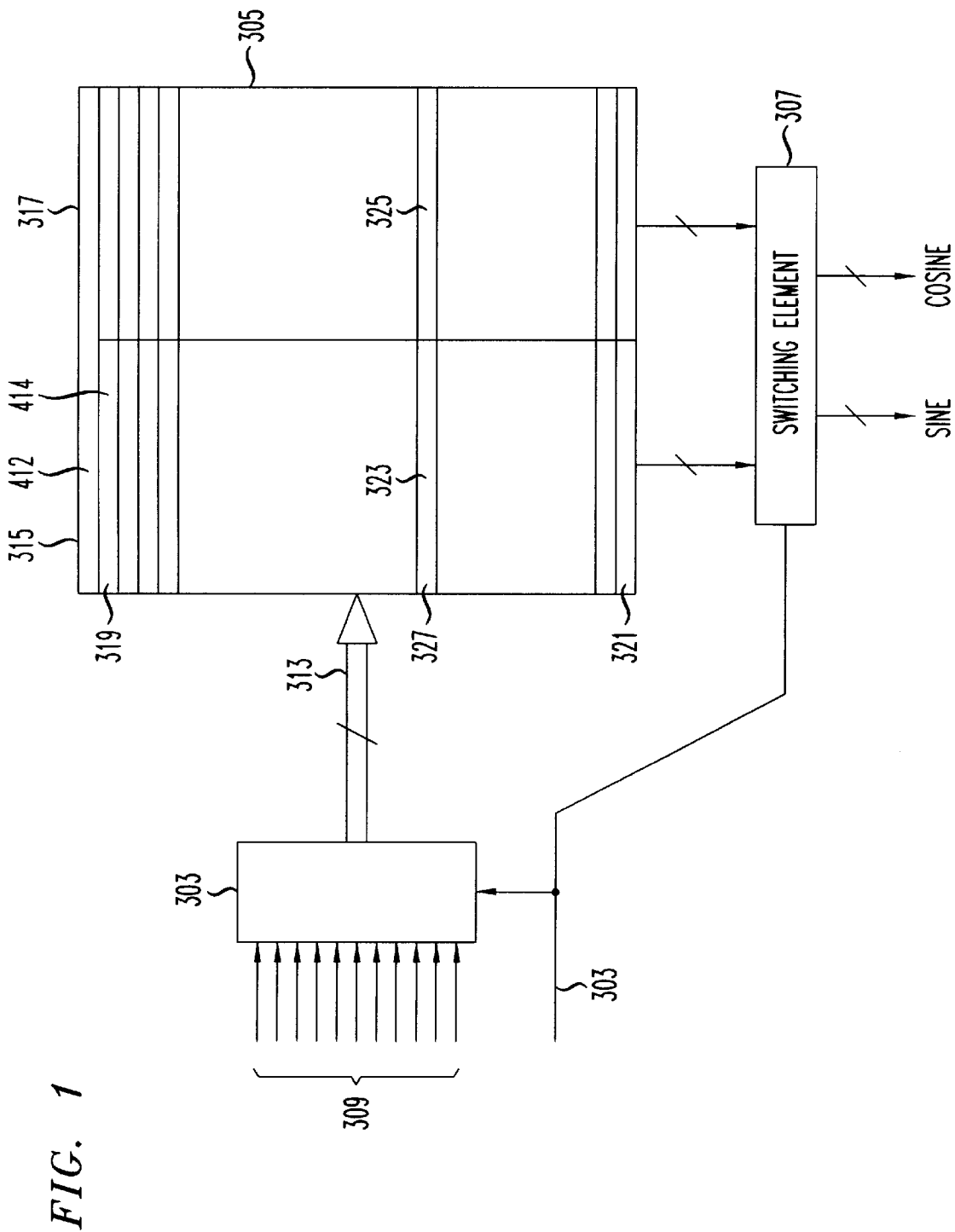
FIG. 1 shows a lookup table according to the invention.

FIG. 1 shows lookup table 301 according to the invention. Sine/cosine lookup table 301 includes complementer 303, memory array 305 and switching element 307. Bit lines 309 and 311 supply a multibit designation to complementer 303. Bit line 311 carries the most significant bit of the multibit designation and bit lines 309 carry the remaining bits of the multibit designation. The multibit designation represents an angle for which the sine and/or cosine are desired. Complementer 303 outputs either the bit values presented on bit lines 309, or a complement, such as, for example, a bit-by-bit complement, of the bit values presented on bit lines 309, to memory array 305. The most significant bit, on bit line 311, is used to indicate to complementer 303 whether to output the value presented on bit lines 309, or to output the complement of the value presented on bit lines 309. For example, if the value on bit line 311 is a logical one, complementer 303 outputs the complement of the value presented on bit lines 309. On the other hand, if the value on bit line 311 is a logical zero, complementer 303 outputs the value presented on bit lines 309.

Complementer 303 and memory array 305 are shown coupled via bus 313. Bus 313 represents one method by which complementer 303 provides its output, in the form of an address signal, to memory array 305. However, the use of a bus is merely by way of example and not of limitation. Any method of communicating between complementer 303 and memory array 305 falls within the scope of the present invention. Memory array 305 receives the address signal from complementer 303 and outputs the two values present in the row indicated by the address signal. One of these values will be from column 315, and the other value will be from column 317. The values from column 315 and 317 are output by memory array 305 to switching element 307. Switching element 307 then outputs these values as the sine and cosine values corresponding to the angle represented by the multibit designation comprising the value presented on bit lines 309 and 311.

Switching element 307 is responsive to the most significant bit, provided on bit line 311, of the multibit designation.

For example, if the most significant bit is a logical zero, then the value output from column 315 is provided as the sine of the angle represented by the multibit designation present on bit lines 309 and 311, while the value output from column 317 is provided as the cosine of the angle represented by the multibit designation present on bit lines 309 and 311. Alternatively, if the value of the most significant bit is a logical 1, switching element 307 will output the value from column 317 as the sine of the angle represented by the multibit designation present on bit lines 309 and 311, and the value from column 315 as the cosine of the angle represented by the multibit designation present on bit lines 309 and 311.

Figure 2:
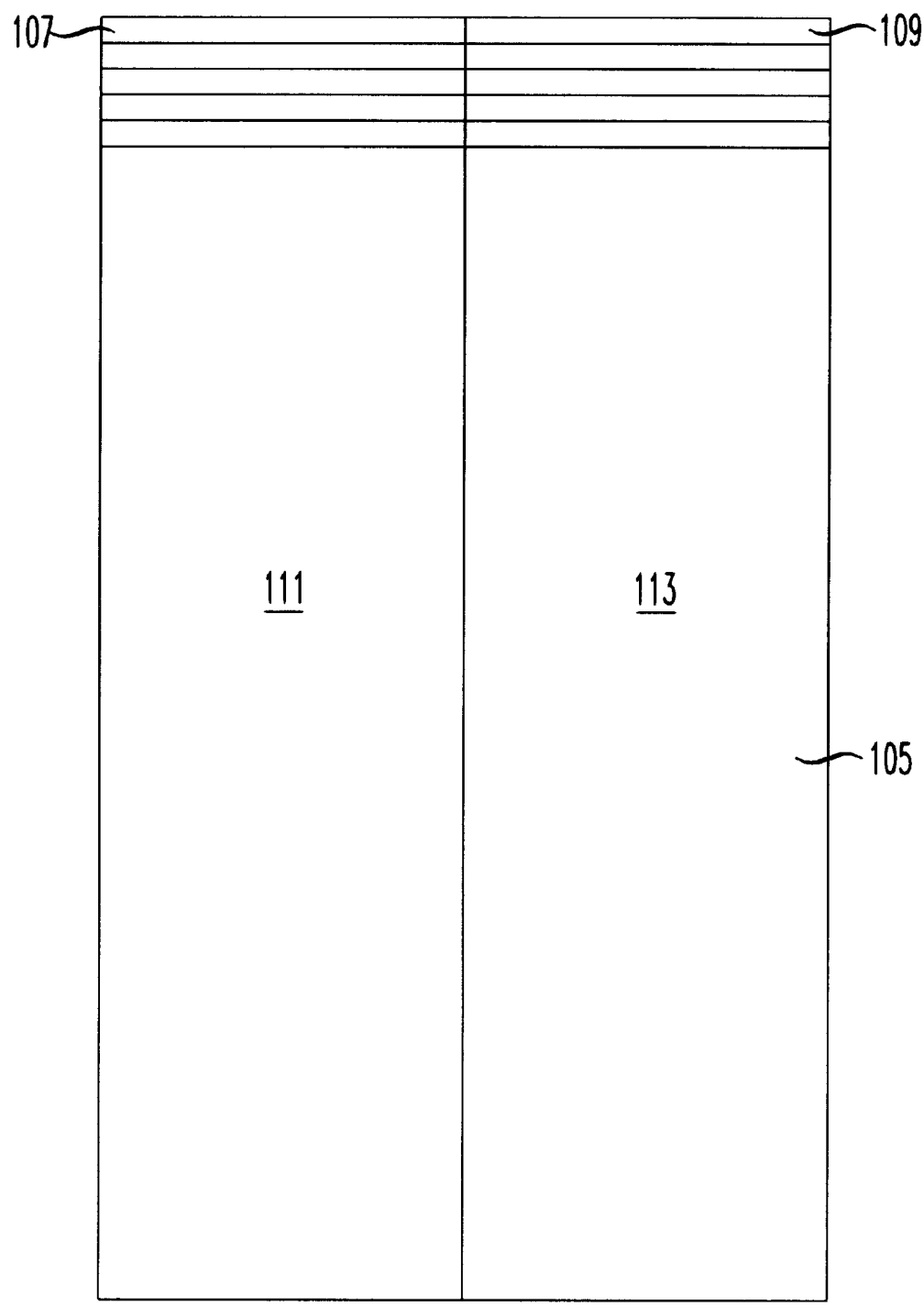
FIG. 2 shows a conventional lookup table.

The lookup table 301 provides significant advantages over conventional systems, such as that shown in FIG. 2. For example, memory array 305 has roughly half the number of memory locations as the array shown in FIG. 2. Further, both the sine and cosine values can be read from lookup table 301 within the same operation. Thus, lookup table 301 generally requires the same number of clock cycles as are required by the lookup table shown in FIG. 2. The memory array shown in FIG. 2 includes values for angles from 0 to 180 degrees. In lookup table 301, only the range from 0 to 90 degrees need be stored in memory array 305. Thus, even though memory array 305 uses half as many memory locations as the lookup table in FIG. 2, memory array 305 provides the same quantization level as is provided by the conventional lookup table of FIG. 2. As noted earlier, other conventional systems can also yield a similar reduction in the number of memory locations, but are unable to provide both the sine and cosine in a single operation.

Conventionally, when looking up the sine and cosine values for an angle greater than 180 degrees, it is known to translate the value greater than 180 degrees to a value less than 180 degrees which has the same sine and cosine, and to then use the value less than 180 degrees as input to the lookup table. The present invention also takes advantage of these well-known features.

The values in memory array 305 are arranged in an order, for example, in ascending order from 0 degrees in row 319, to 45 degrees in row 321. Operationally, presume it is desired to perform an operation to look up the sine and cosine of 30 degrees and to then perform an operation to look up the sine and cosine of 60 degrees. Memory cell 323 contains the value of the sine of 30 degrees. Memory cell 325 contains the value of the cosine of 30 degrees. Thus, when looking up the sine and cosine of 30 degrees, the most significant bit, on bit line 311, is a logical zero, and the remaining bits on bit lines 309, corresponding to the value of 30 degrees (typically expressed in radians) yield an address which points to row 327. The values contained in memory cells 323 and 325 are then output to switching element 307 from memory array 305. Because the value on bit line 311 is a 0, switching element 307 does not change an order of the values input from memory array 305, and outputs the value from memory cell 323 as the sine value and the value from memory cell 325 as the cosine value.

The value in memory cell 323 also is the value of the cosine of 60 degrees, while the value in memory cell 325 also is the sine of 60 degrees. Thus, when the value on bit lines 309 and 311 represents 60 degrees, the same values (i.e., the values in memory cells 323 and 325) that were output when looking up the sine and cosine of 30 degrees, will also be output when looking up the sine and cosine of 60 degrees. The value on bit line 311 is a logical one for angles greater than or equal to 45 degrees. Thus, when looking up the sine and cosine for 60 degrees, the value on bit line 311 causes complementer 303 to complement the values on bit lines 309 to create the address signal input to memory array 305 on, for example, bus 313. Similarly, the value on bit line 311 causes switching element 307 to output the value in memory cell 325 as the sine value and to output the value in memory cell 323 as the cosine value.

By recognizing that the most significant bit on bit line 311 corresponds to a value of 45 degrees, the purpose of complementer 303 becomes readily apparent. For example, in the case where the target angle is 60 degrees, a 1 on bit line 311 (the most significant bit) corresponds to 45 degrees of the 60 degree value. The values on bit lines 309 thus correspond to the remaining 15 degrees, since 45+15=60. If uncomplemented, therefore, the value on bit lines 309 would not point to row 327, corresponding to 30 degrees, but would point to a different row corresponding to 15 degrees. However, the complement of the value corresponding to 15 degrees (the value present on bit lines 309 for an input value of 60 degrees) is a value corresponding to 30 degrees. Thus, for the 60 degree example, the value corresponding to 15 degrees input on bit lines 309 is complemented by complementer 303 to yield a value corresponding to 30 degrees which is output as the address signal on, for example, bus 313. Thus, by use of complementer 303 and switching element 307, lookup table 301 can employ memory array 305, which has half as many memory locations as a conventional memory array, and can provide both the sine and cosine values within a single clock cycle.

Extending the above example, a binary value for the radian equivalent of 30 degrees can be expressed as a 12-bit value 010101010101, and a similar value for 60 degrees can be expressed as 101010101010. In this example, when the sine and cosine of 30 degrees are desired, bit line 311 will have the MSB of 0, and bit lines 309 will contain the values 10101010101, which will be output uncomplemented by complementer 303 as the address signal on bus 313. When the sine and cosine of 60 degrees are desired, on the other hand, bit line 311 will have the MSB of 1, and bit lines 309 will have the value 01010101010, which will be complemented by complementer 303 to produce address signal 10101010101 on bus 313. Thus, for both 30 degrees and 60 degrees, the same address signal is provided on bus 313. As discussed above, in this example the address on bus 313 corresponds to row 327 and causes memory array 305 to output the values in memory locations 323 and 325. When the MSB on line 311 is a 0 (30 degrees), switching element 307 will output the value in location 323 as the sine and the value in location 325 as the cosine, and when the MSB is a 1 (60 degrees), switching element 307 will output the value in location 323 as the cosine and the value in location 325 as the sine.

In memory array 305, the values stored in the memory locations correspond to the sine and cosine of given angles. Bit lines 309 and 311 carry a 12-bit word. Each row of memory array 305 is uniquely addressed by a corresponding 11-bit portion of the twelve bit word contained on bit lines 309. As is known to one of ordinary skill in the art, by dividing the 45 degree zone into $2^{11}$ (2,048) discrete rows, a certain quantization error is introduced. In another embodiment according to the invention, the quantization error can be reduced by having the values stored in the memory cells of memory array 305 not exactly correspond to the angle represented by the address signal 313 or the angle represented by the value on bit lines 309 and 311. Instead, the values stored in the memory cells of memory array 305, according to the alternative embodiment, represent the sine and cosine values for an angle between, and preferably halfway between, two adjacent rows in memory array 305. Thus, for example, memory cell 412 does not contain the value for the sine of 0 radians. Instead, it contains the value for the sine of 0.5÷2,048×π/4 radians. Similarly, memory cell 414 contains the value for the sine of 1.5÷2,048×π/4 radians. In this way, the quantization error introduced by memory array 305 can be effectively cut in half. Alternatively, for the same quantization error, the number of memory location in memory array 305 can be cut in half. By storing values that are between the quantization distance between two adjacent rows, in memory array 305, the quantization error introduced by truncation is effectively cut in half, since the maximum error resulting from truncation is now one-half as large as that demonstrated on a conventional system.

A sine/cosine lookup table according to the invention, as described above with respect to FIG. 1, can be incorporated into a system such as a modem. The resulting modem will thus require fewer memory locations in its memory array, and will be able to perform sine/cosine lookup operations in one clock cycle. Having described exemplary embodiments of this invention, it would now be apparent to one skilled in the art that other embodiments incorporating its concept may be used. Therefore, this invention should not be limited to the disclosed embodiments, but rather should be limited only by the spirit and scope of the appended claims.

The invention claimed is:

1. A lookup table, comprising:
    a complementer adapted to selectively complement a subset of bits of a multibit designation of an angle based on a most significant bit of the multibit designation to produce an address signal;
    a memory addressed by the address signal and adapted to produce two values; and
    a switching element adapted to receive the two values from the memory and selectively output the values based on the most significant bit.

2. A lookup table as recited in claim 1, wherein the multibit designation contains n bits, and wherein the memory is an array containing $2^{n-1}$ rows.

3. A lookup table as recited in claim 2, wherein each of the $2^{n-1}$ rows corresponds to an angle between zero degrees and 45 degrees.

4. A lookup table as recited in claim 3, wherein each row contains sine and cosine values associated with the corresponding angle.

5. A lookup table as recited in claim 3, wherein each row contains sine and cosine values associated with an angle between the angle corresponding to the row and an angle corresponding to an adjacent row.

6. A lookup table as recited in claim 5, wherein the sine and cosine values are associated with an angle substantially centered between the angle corresponding to the row and the angle corresponding to the adjacent row.

7. An integrated circuit based modem, including a lookup table, comprising:
    a complementer adapted to selectively complement a subset of bits of a multibit designation of an angle based on a most significant bit of the multibit designation to produce an address signal;
    a memory addressed by the address signal and adapted to produce two values; and
    a switching element adapted to receive the two values from the memory and selectively output the values based on the most significant bit.

8. A modem as recited in claim 7, wherein the multibit designation contains n bits, and wherein the memory is an array containing $2^{n-1}$ rows.

9. A modem as recited in claim 8, wherein each of the $2^{n-1}$ rows corresponds to an angle between zero degrees and 45 degrees.

10. A modem as recited in claim 9, wherein each row contains sine and cosine values associated with the corresponding angle.

11. A modem as recited in claim 9, wherein each row contains sine and cosine values associated with an angle between the angle corresponding to the row and an angle corresponding to an adjacent row.

12. A modem as recited in claim 11, wherein the sine and cosine values are associated with an angle substantially centered between the angle corresponding to the row and the angle corresponding to the adjacent row.

13. A method of obtaining sine and cosine values corresponding to an angle, comprising the steps of:
    breaking a multibit designation corresponding to the angle into a most significant portion and a non-most significant portion;
    selectively complementing the non-most significant portion based on the most significant portion to produce an address signal;
    inputting the address signal to a memory;
    reading first and second values addressed by the address signal from the memory; and
    selectively outputting the first value and the second value as the sine and cosine of the angle based on the most significant portion.

14. A method as recited in claim 13, wherein the most significant portion is a most significant bit, and the non-most significant portion is all bits other than the most significant bit.

15. A method as recited in claim 13, wherein the first and second value are associated with an angle substantially half way between an angle represented by the multibit designation and an angle adjacent to the angle represented by the multibit designation.

16. A lookup table, comprising:
    a complementer adapted to complement a subset of bits of a multibit designation based on another subset of bits of the multibit designation to produce an address signal; and
    a memory configured into a plurality of rows, each row corresponding to a unique address signal,
    wherein values stored in each row of the memory are associated with an address value between the address of the row and the address of an adjacent row.

17. A lookup table as recited in claim 16, wherein the values stored in each row of the memory are associated with an address substantially half way between the address of the row and the address of an adjacent row.

18. A lookup table as recited in claim 17, wherein the address signal corresponds to an angle between zero and 45 degrees.

19. A lookup table as recited in claim 18, wherein the values stored in each row are trigonometric values related to an angle between the angle represented by the address of the row and the angle represented by the address of an adjacent row.

20. A lookup table as recited in claim 19, wherein the values are sine and cosine values related to an angle substantially half way between the angle represented by the address of the row and the angle represented by the address of the adjacent row.

* * * * *